Inventors
J. Albon Bascle
and William H. Berry
By Wilkinson & Mawhinney
Attorneys.

Jan. 5, 1937. J. A. BASCLE ET AL 2,066,450
HYDRAULIC CLUTCH
Filed Jan. 21, 1936 3 Sheets-Sheet 3

Inventors
J. Albon Bascle
William H. Berry
By Wilkinson & Mawhinney
Attorneys.

Patented Jan. 5, 1937

2,066,450

UNITED STATES PATENT OFFICE 2,066,450

HYDRAULIC CLUTCH

Joseph Albon Bascle and William Harold Berry, New Orleans, La.

Application January 21, 1936, Serial No. 60,109

5 Claims. (Cl. 192—61)

This invention relates to transmissions and clutches and more particularly to a combined transmission and clutch of the constantly meshed gear type.

An object of this invention is to provide a combined clutch and transmission for use with a power means, such as an internal combustion engine in a motor vehicle, or for use wherever a transfer of power is desired.

Another object of this invention is to provide a combined clutch and transmission which is so constructed as to eliminate the necessity of changing gears, the speed ratio of the driven element with respect to the driving element being effected in a smooth manner through the use of a changeable clutching device.

A further object of this invention is to provide a combined clutch and transmission which may be incorporated in a flywheel, and wherein the flywheel constitutes an important element in the effectiveness of the device.

A still further object of the invention is in the provision of a hydraulic means for effecting a change in the speed ratio between the driven and the driving elements.

Still another object of this invention is in the provision of a means in combination with the flywheel of the engine or motor whereby the hydraulic system is maintained in a filled condition at all times.

With the foregoing and other objects in view, the invention will be more fully described hereinafter and will be more particularly pointed out in the claims appended hereto.

In the drawings, wherein like symbols refer to like or corresponding parts throughout the several views, Figure 1 is a longitudinal section, partly in detail and partly broken away and in section, of a combined clutch and transmission constructed according to an embodiment of this invention.

Figure 1:
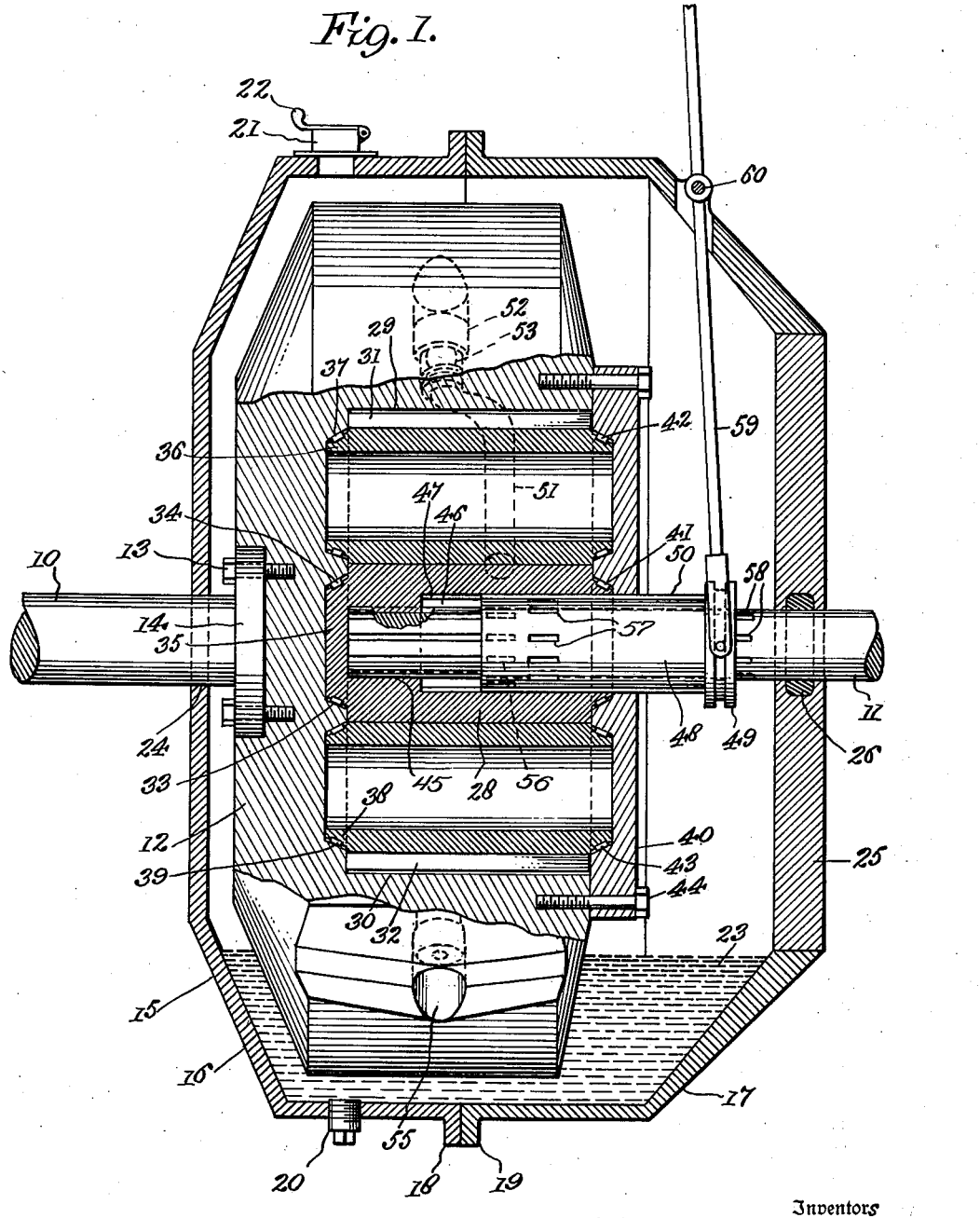

Referring to the drawings, the numeral 10 designates a driving shaft and the numeral 11 a driven shaft, the driving shaft 10 being connected to a suitable source of power supply, and the driven shaft being connected to a means to be operated at varying speeds from the driving shaft 10. A flywheel 12 is interposed between the driving shaft 10 and the driven shaft 11, and is fixed to the driving shaft 10 by means of bolts 13 extending through a flange 14 also fixed to the driving shaft 10. It will be understood that any suitable form of attaching means other than that here disclosed may be used for securing the flywheel 12 to the driving shaft 10.

A housing 15 constructed of sections 16 and 17 having abutting flanges 18 and 19 is disposed loosely about the flywheel, and the flanges 18 and 19 form a means by which the housing sections 16 and 17 may be secured together. The housing 15 has a drain plug 20 adjacent the bottom thereof, and a filler cap 21 provided with a hinged closure 22 in the upper portion thereof. The housing 15 is adapted to receive a suitable liquid 23 in the form of oil or the like.

The shaft 10 extends through a wall of the housing section 16, and if desired a gland or other sealing means may be used to prevent leakage of the oil through the bearing or opening 24 provided in the housing section 16. The shaft 11 extends through a plate or cover 25 fixed to the housing section 17, and in this instance a sealing member 26 is carried by the central portion of the plate 25, although if desired any other suitable form of gland or sealing means may be provided to prevent leakage of the oil about the shaft 11. The sealing member 26 in this instance is embedded in the plate 25 and may be constructed of any suitable material used for this purpose. The housing 15 is of course fixed against rotation in any suitable manner, and for this purpose may be provided with arms or lugs (not shown) which may be attached to a suitable support.

The flywheel 12 is provided with an axial bore 27 which extends inwardly from the driven side thereof and terminates inwardly of the driving side thereof, as shown in Figure 1. A driving gear 28 is rotatably disposed within this bore 27, having a relatively snug fit therein so that the oil or other liquid cannot move past the teeth thereof. The flywheel 12 is also provided with bores 29 and 30 in which gears 31 and 32, respectively, are disposed, these latter gears also being snugly fitted into their respective bores.

A bearing seat 33 is provided in the flywheel 12 axially of the bore 27 on the inner end of this bore, and rollers 34 or other anti-friction elements are carried by a stub 35 at the inner end of the gear 28. The gear 31 at its inner end is provided with a stub 36 carrying roller or other anti-friction elements engaging a seat 37, and the gear 32 also has a similar stub 38 provided with roller or other anti-friction elements engaging a seat 39 provided in the flywheel 12. The driven side of the flywheel 12 is provided with a bore covering plate 40 provided with bearing seats 41, 42, and 43, for the anti-friction elements carried by the outer stub ends of the gears 28, 31 and 32, respectively. The plate 40 is fastened to the rear side of the flywheel 12 by means of bolts 44 or the like.

The central or driving gear 28 has a bore 45 terminating short of the inner end of the gear, and the end of the driven shaft 11 is splined into this bore 45. The driving gear 28 also has a bore 46 axially of the bore 45 and relatively larger in diameter than the bore 45, and this bore 46 has opposed longitudinal grooves or keyways 47.

A speed controlling sleeve 48 provided with a grooved collar 49 is slidable on the driven shaft 11 and slidably engages in the bore 46. The sleeve 48 has opposed longitudinal ribs 50 which engage in the grooves 47 of the gear 28. The bore 46 is relatively shorter in length than the bore 45, and opens through the rear end of the flywheel 12, whereas the bore 45 due to its smaller diameter opens at its rear end into the bore 46.

Figure 2:
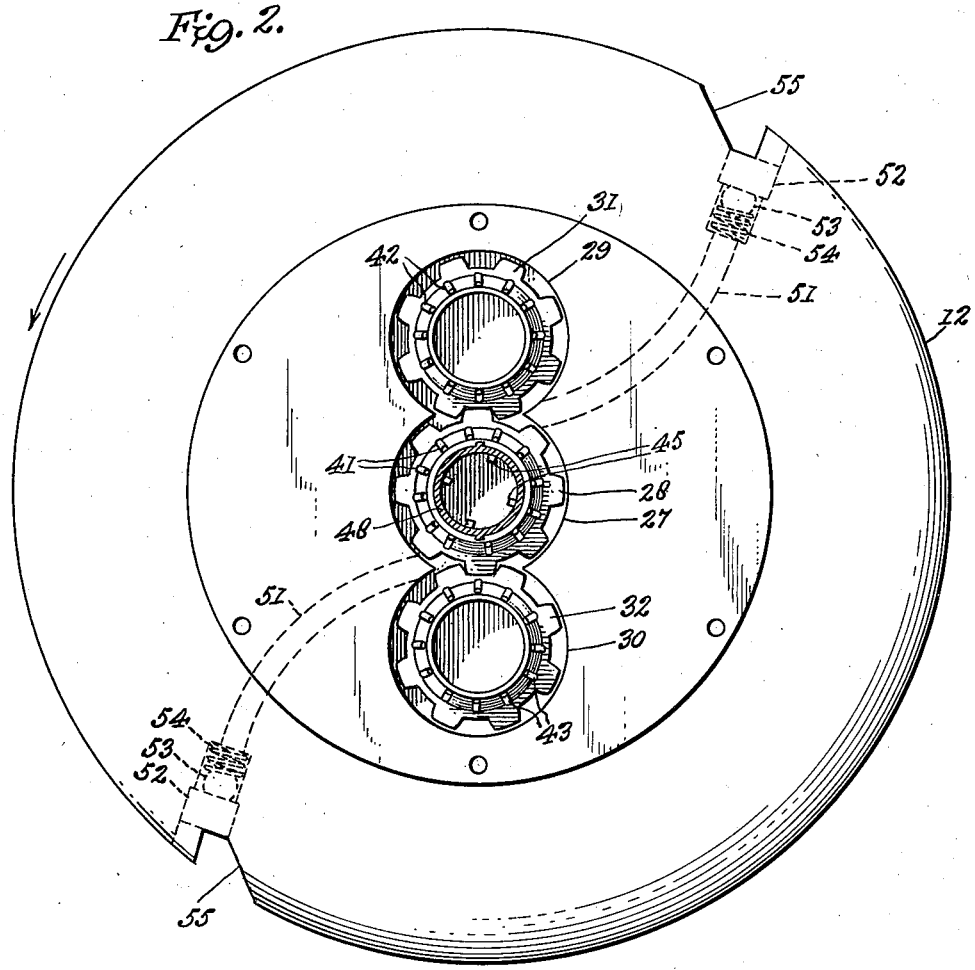
Figure 2 is a detail side elevation of the device removed from the housing and with the removable end plate taken off to show the arrangement of the gears within the flywheel.
Figure 5:
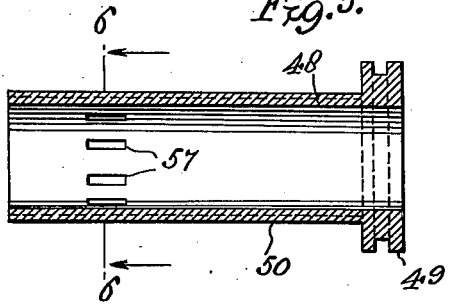
Figure 5 is a longitudinal section of the controlling valve for regulating the clutching or declutching of the gears.
Figure 6:
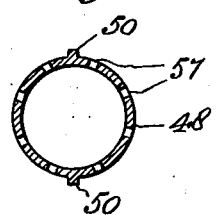
Figure 6 is a sectional view taken on the line 6—6 of Fig. 5.
Figure 3:
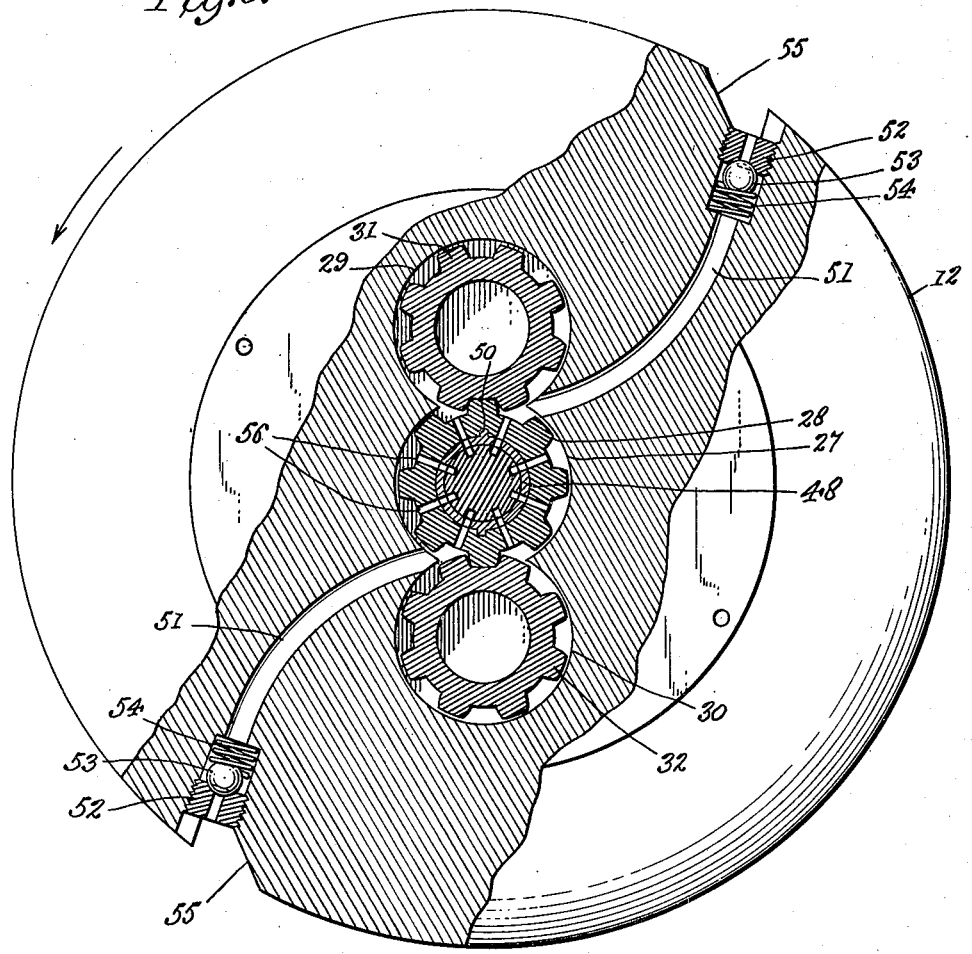
Figure 3 is a view similar to Fig. 2 but with the flywheel broken away and in section and with the gears in section.
Figure 4:
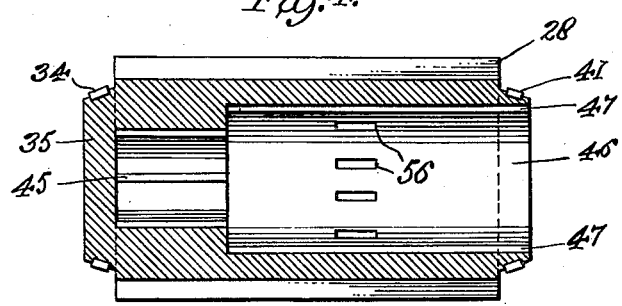
Figure 4 is a longitudinal section of the main or driving gear.

In order to provide a means whereby the liquid 23 may be used to control the speed of the driven shaft 11 with respect to the driving shaft 10, I have provided a pair of liquid conveying channels 51 which are longitudinally curved and which open through diametrically opposed points in the flywheel 12. The inner ends of the channels 51 open in the bore 27 of the flywheel 12 as shown in Figs. 1 and 2. A valve seat 52 is threaded into the flywheel 12 at the end of a channel 51, and a ball valve member 53 engages against the seat 52 and is held against the seat 52 by means of a spring 54. The valve 53 is thus an inwardly opening valve, but is moved off of the seat 52 by means of the liquid 23 engaging in a V-shaped scoop 55 so that at every rotation of the flywheel 12 there will be two impulses, one for each valve 53 acting to maintain the channels 51 filled with oil.

The driving gear 28 is provided between each pair of teeth with oil outlet channels or openings 56 which are relatively long, and the control valve 48 is also provided with outlet openings 57 adapted upon movement of the valve 48 to register with the openings 56. These openings 56—57 are substantially equal in number to the number of longitudinal grooves 58 forming the splines on the driven shaft 11 so that the grooves 58 will provide outlet channels by means of which the oil may pass out of the flywheel 12 and into the housing 15.

In the use and operation of this combined clutch and change-speed mechanism, assuming that the driven shaft 11 is at a standstill and the driving shaft 10 is rotating. The flywheel 12 will, of course, rotate with the driving shaft 10, and to maintain the driven shaft 11 stationary the controlling valve 48 is held in a position with the openings 57 therein registering with the openings 56 in the central gear 28. The valve 48 is moved longitudinally of the driven shaft 11 and the gear 28 by means of a forked operating lever 59 mounted on a pivot 60 carried by the housing 15. Oil is pumped into the oil channels 51 at each revolution of the flywheel 12, and preferably the pumping action is equal to the flow of the oil through the outlet channels 56, 57, and 58 when the valve 48 is in an open position. Rotation of the shaft 11 is effected by movement of the valve 48 under the rocking of the operating lever 59. Gradual speeding up of the driven shaft 11 is effected by gradual movement of the valve 48 which will gradually restrict the flow of oil through the openings 56 and 57, the openings 57 being gradually moved out of register with the openings 56. In view of the fact that the oil cannot flow past the teeth of the gears 28, 31 and 32, the restriction of the outlet openings 56—57 will act to retard the rotation of the central or driving gear 28 and thus effect rotation of the driven shaft 11 which is splined in the bore 45 of the gear 28. When the valve 48 is moved to a completely closed position, which is the position shown in Fig. 1, no oil can flow through the outlet openings 57 or the outlet channels 58, and as the fluid channels 51 are maintained in a filled condition by the pumping action caused by rotation of the flywheel 12 and the inwardly opening valves 53, the gear 28 will be locked against rotation relative to the flywheel 12 and thus effect a direct drive between the driving shaft 10 and the driven shaft 11.

Any desired intermediate speed may be obtained, depending only upon the length of the outlet openings 56—57 and the position of the valve 48. It will be apparent that the driven shaft 11 will be rotated under the action of constantly meshing gears, with the gears acting not as a change-speed means but as a differential clutching means and liquid locking means. A suitable reversing mechanism for the driven shaft 11 may be associated with this combined clutch and transmission and when disposed at a point rearwardly of the housing 15 the same reverse speeds may be obtained as are obtained by the forward speeds.

A clutch-transmission of the type hereinbefore described may be constructed at a relatively low cost, and due to the immersion of the gears in oil there will be relatively little wear thereon, and the only part that must be given any care is the supply of oil in the reservoir or housing 15.

It will be obvious that various changes may be made in the construction, combination and arrangement of parts which could be used without departing from the spirit of my invention, and I do not mean to limit the invention to such details except as particularly pointed out in the claims.

Having thus described my invention, what I claim and desire to secure by Letters Patent of the United States is:—

1. A combined clutch and transmission for a driving shaft and a driven shaft, comprising a housing, a liquid in the housing, an annular member in the housing, means for securing the member to the driving shaft, said member having a plurality of bores therein, intermeshing gears in said bores, valved means carried by the member for forcing the liquid toward said gears upon rotation of the member, means for connecting the driven shaft to one of said gears, said one gear having a bore therein relatively larger than the diameter of the driven shaft, and also having a radial outlet open between each pair of teeth, and a speed controlling valve slidable between said driven shaft and said one gear and provided with outlet openings adapted to register with the openings in said one gear.

2. A hydraulic clutch and transmission comprising a housing, a liquid in the housing, an annular driving member in the housing, means for securing the driving member to a driving shaft, communicating chambers in the member, means for pumping the liquid into said chambers on each revolution of the member, intermeshing gears in said chambers, one of said gears having a radially disposed outlet passage between each pair of teeth, said one gear having a relatively small splined bore to receive an end of a driven shaft and also having a relatively large bore coaxial with said first bore, a valve member slidable in said large bore and provided with outlet openings adapted to register with the outlet passages of said one gear, and operating means for said valve member.

3. A hydraulic clutch and transmission comprising a housing, a liquid in the housing, an annular driving member in the housing, means for securing the driving member to a driving shaft, communicating chambers in the member, intake passages opening into said chambers and opening through the periphery of said annular member, inwardly opening valves in said intake passages adjacent the periphery of said annular member, intermeshing gears in said chambers, one of said gears having radially disposed passages between the teeth thereof, said one gear having a relatively small splined bore to receive an end of a driving shaft and also having a relatively large bore coaxial with said first bore, a valve member slidable in said large bore and provided with outlet openings adapted to register with the radial passages of said one gear, and operating means for said valve member.

4. A hydraulic clutch and transmission comprising a housing, a liquid in the housing, an annular driving member in the housing, means for securing the driving member to a driving shaft, communicating chambers in the member, intake passages opening into said chambers and opening through the periphery of said annular member, inwardly opening valves in said intake passages adjacent the periphery of said annular member, scoop means carried by said annular member associated with said intake passages for forcing oil into said passages on each revolution of said annular member, intermeshing gears in said chambers, one of said gears having radially disposed passages between the teeth thereof, said one gear having a relatively small splined bore to receive an end of a driving shaft and also having a relatively large bore coaxial with said first bore, a valve member slidable in said large bore and provided with outlet openings adapted to register with the radial passages of said one gear, and operating means for said valve member.

5. A hydraulic clutch and transmission comprising a housing, a liquid in the housing, an annular driving member in the housing, means for securing the driving member to a driving shaft, a centrally disposed chamber in said member, a pair of diametrically disposed chambers disposed in parallel relation to said central chamber and communicating therewith, a gear in each chamber, the gears in said pair of chambers intermeshing with the gear in the central chamber, liquid passages communicating at one end with said chambers and opening through the periphery of said annular member, means for forcing the liquid into said passages on each revolution of said annular member, means for connecting the central gear with a driving element, said central gear having discharge ports therein, and adjustable means rotatable with said central gear controlling the opening of said discharge ports.

JOSEPH ALBON BASCLE.
WILLIAM HAROLD BERRY.